(12) United States Patent
Regueira Caumel et al.

(10) Patent No.: US 10,517,007 B2
(45) Date of Patent: Dec. 24, 2019

(54) RECEIVED SIGNAL STRENGTH BASED INTERFERER CLASSIFICATION OF CELLULAR NETWORK CELLS

(71) Applicant: Telefonaktiebolaget LM Ericsson (publ), Stockholm (SE)

(72) Inventors: Ángel Regueira Caumel, Málaga (ES); Victor Buenestado García, Málaga (ES); Isabel De La Bandera Cascales, Málaga (ES); José María Ruiz Avilés, Málaga (ES); Matías Toril Genovés, Málaga (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 161 days.

(21) Appl. No.: 15/505,202

(22) PCT Filed: Aug. 21, 2014

(86) PCT No.: PCT/EP2014/067819
§ 371 (c)(1),
(2) Date: Feb. 20, 2017

(87) PCT Pub. No.: WO2016/026531
PCT Pub. Date: Feb. 25, 2016

(65) Prior Publication Data
US 2017/0257787 A1    Sep. 7, 2017

(51) Int. Cl.
*H04W 24/10*    (2009.01)
*H04W 24/02*    (2009.01)
(Continued)

(52) U.S. Cl.
CPC .......... *H04W 24/10* (2013.01); *H04W 24/02* (2013.01); *H04W 24/08* (2013.01); *H04W 52/243* (2013.01)

(58) Field of Classification Search
CPC ... H04W 24/10; H04W 24/08; H04W 52/243; H04W 24/02; H04W 28/0236; H04W 36/20; H04W 40/16; H04W 72/082
See application file for complete search history.

(56) References Cited

U.S. PATENT DOCUMENTS

| | | | |
|---|---|---|---|
| 10,298,354 B2 * | 5/2019 | Kronestedt | H04B 7/024 |
| 2007/0225029 A1 * | 9/2007 | Abusch-Magder | H04W 24/02 455/525 |

(Continued)

FOREIGN PATENT DOCUMENTS

| | | |
|---|---|---|
| WO | 2011028158 A1 | 3/2011 |
| WO | 2011103515 A1 | 8/2011 |

OTHER PUBLICATIONS

Aexio; "Analyzing Pilot Pollution with GPEH Data"; Retrieved from the Internet: URL:http://aexio.com/content/pdf/01_GPEH%20Analysis-%20Pilot%20Pollution.pdf [retrieved on Mar. 28, 2017]; 2011; pp. 1-4.

(Continued)

*Primary Examiner* — Marcus Hammonds
(74) *Attorney, Agent, or Firm* — Sage Patent Group

(57) ABSTRACT

A node (100, 200) of a cellular network obtains reports of measurements for a given cell (20) of the cellular network. The measurements are performed by one or more communication devices (10) associated with a surrounding cell (21) of the given cell. Each measurement indicates a received signal strength of a signal (RS) from the given cell (20). On the basis of the received signal strengths, the node (100) determines a level of interference generated by the given cell (20) with respect to the surrounding cell (21).

14 Claims, 13 Drawing Sheets

(51) Int. Cl.
*H04W 24/08* (2009.01)
*H04W 52/24* (2009.01)

(56) References Cited

U.S. PATENT DOCUMENTS

| | | | | |
|---|---|---|---|---|
| 2009/0197588 | A1* | 8/2009 | Khandekar | H04W 72/082 455/422.1 |
| 2012/0046063 | A1* | 2/2012 | Chande | H04W 52/143 455/522 |
| 2012/0165064 | A1* | 6/2012 | Koutsimanis | H04B 7/024 455/524 |
| 2014/0162682 | A1* | 6/2014 | Tafreshi | H04W 24/02 455/456.1 |
| 2015/0146557 | A1* | 5/2015 | Pan | H04L 5/0051 370/252 |

OTHER PUBLICATIONS

Aircom; "3G Optimization using Drive Test Data"; Retrieved from the Internet: URL;http://www.authorstream.com/Presentation/robertabbas2000-1545127-80090177-3g-optimization-using-drive-test-data/ [retrieved on Mar. 28, 2017]; 2008; pp. 1-10.

Analyzeractix "UMTS Analysis Guide"; Retrieved from the Internet: URL:http://es.scribd.com/doc/192483336/11/CPICH-Pollution-Analysis-Module [retrieved on Mar. 28, 2017]; Nov. 2005; pp. 1-47.

Barco et al. "Analysis of mobile measurement-based interference matrices in GMS networks"; IEEE VTS 54th Vehicular Technology Conference (VTC Fall 2001); Oct. 2001; pp. 1412-1416; vol. 3; ISSN 1090-3038, Print ISBM 0-7803-7005-8.

Matamales et al. "Performance Assessment of HSDPA networks From Outdoor Drive-Test Measurements"; IEEE 59th Vehicular Technology Conference (VTC Spring 2009), Apr. 2009; pp. 1-5; Print ISBN 978-1-4244-2517-4.

Toril et al. "Impact of Antenna Downtilting on Network Performance in GERAN Systems"; IEEE Communications Letters; Jul. 2005; vol. 9, No. 7; pp. 598-600, ISSN 1089-7798.

* cited by examiner

US 10,517,007 B2

RECEIVED SIGNAL STRENGTH BASED INTERFERER CLASSIFICATION OF CELLULAR NETWORK CELLS

TECHNICAL FIELD

The present invention relates to methods for managing a communication network and to corresponding devices.

BACKGROUND

In cellular networks, one cell may cause interference to other cells. This may for example be due to an improper tilt angle of an antenna used to serve the cell with radio signals. Typically, a tilt angle which is too close to the vertical direction may result in overshooting of the radio signals to neighboring cells. For purposes of managing the cellular network, it is desirable to identify such overshooting, so that it can be resolved, e.g., by downtilting the antenna.

In "Impact of antenna downtilting on network performance in GERAN system", by Wille et al., in IEEE Communication Letters, July 2005, vol. 9, no. 7, pp. 598-600 a cell overshooting indicator is described which is built from Timing Advance (TA) measurements available in base stations. Such a TA overshooting indicator is measured on a per-cell basis as the percentage of TA samples of users in a cell that fall beyond the nominal cell distance, defined as the average distance to neighbor sites. This indicator may be used to rank cells in the network in terms of the need for downtilting their antennas.

However, such TA measurements may in some cases fail to provide sufficient accuracy for identification of overshooting. Further, it may cause additional effort to obtain a required number of such TA measurements for statistical analysis. Moreover, such TA measurements do not reflect a level of interference caused by the cell, but rather constitute an estimate how far the radio signals reach from the cell. In some cases, radio signals may reach far into a neighboring cell, but still not constitute a relevant source of interference, e.g., because radio signals of the neighboring cell are significantly stronger at these locations.

Accordingly, there is a need for techniques which allow for efficiently managing a cellular network communication network in view of interference between cells.

SUMMARY

According to an embodiment of the invention, a method of managing a cellular network is provided. According to the method, a node of the cellular network obtains reports of measurements for a given cell of the cellular network. The measurements are performed by one or more communication devices associated with a surrounding cell of the given cell. Each measurement indicates a received signal strength of a signal from the given cell. On the basis of the received signal strengths, the node determines a level of interference generated by the given cell with respect to said surrounding cell.

According to a further embodiment of the invention, a method of managing a cellular network is provided. According to the method, an access node serving a given cell of the cellular network receives, from access nodes serving one or more surrounding cells of the given cell, indications whether the given cell is classified as a relevant interferer of the respective surrounding cell. On the basis of the indications, the access node serving the given cell determines an indicator of a level of interference generated by the given cell with respect to the surrounding cells.

According to a further embodiment of the invention, a node for a cellular network is provided. The node comprises at least one interface for obtaining reports of measurements performed by one or more communication devices in the cellular network. Further, the node comprises at least one processor. The at least one processor is configured to obtain, for a given cell of the cellular network, reports of measurements performed by one or more communication devices associated with a surrounding cell of the given cell. Each measurement indicates a received signal strength of a signal from the given cell. Further, the at least one processor is configured to determine, on the basis of the received signal strengths, a level of interference generated by the given cell with respect to said surrounding cell.

According to a further embodiment of the invention, an access node for a cellular network is provided. The access node comprises at least one interface for serving a given cell of the cellular network. Further, the access node comprises at least one interface for communication with other access nodes of the cellular network. Further, the access node comprises at least one processor. The at least one processor is configured to receive, from access nodes serving one or more surrounding cells of the given cell, indications whether the given cell is classified as a relevant interferer of the respective surrounding cell. Further, the at least one processor is configured to determine, on the basis of the indications, an indicator of a level of interference generated by the given cell with respect to the surrounding cells.

According to a further embodiment of the invention, a system is provided. The system comprises an access node serving a given cell of a cellular network. Further, the system comprises a plurality of further access nodes serving surrounding cells of the given cell. Each of the further access nodes is configured to obtain, for a given cell of the cellular network, reports of measurements performed by one or more communication devices associated with the surrounding cell served by this further access node. Each measurement indicates a received signal strength of a signal from the given cell and a received signal strength of a signal received from the surrounding cell served by this further access node. Further, each of the further access nodes is configured to compare the received signal strength of the signal from said given cell to the received signal strength of the signal from the surrounding cell served by this further access node. Further, each of the further access nodes is configured to classify, on the basis of the comparison, said given cell as a relevant interferer of the surrounding cell and to send, to the access node serving the given cell, an indication whether the given cell is classified as a relevant interferer of the surrounding cell. The access node serving the given cell is configured to receive the indications from the further access nodes and, on the basis of the indications, determine an indicator of a level of interference generated by the given cell with respect to the surrounding cells.

According to a further embodiment of the invention, a computer program or computer program product is provided, e.g., in the form of a non-transitory storage medium, which comprises program code to be executed by at least one processor of a node of a cellular network. Execution of the program code causes the at least one processor to obtain, for a given cell of the cellular network, reports of measurements performed by one or more communication devices associated with a surrounding cell of the given cell. Each measurement indicates a received signal strength of a signal from the given cell. Further, execution of the program code causes the at least one processor to determine, on the basis of the received signal strengths, a level of interference generated by the given cell with respect to said surrounding cell.

According to a further embodiment of the invention, a computer program or computer program product is provided, e.g., in the form of a non-transitory storage medium, which comprises program code to be executed by at least one processor of an access node of a cellular network. Execution of the program code causes the at least one processor to receive, from access nodes serving one or more surrounding cells of the given cell, indications whether the given cell is classified as a relevant interferer of the respective surrounding cell. Further, execution of the program code causes the at least one processor to determine, on the basis of the indications, an indicator of a level of interference generated by the given cell with respect to the surrounding cells.

Details of such embodiments and further embodiments will be apparent from the following detailed description of embodiments.

DETAILED DESCRIPTION OF EMBODIMENTS

Figure 1:
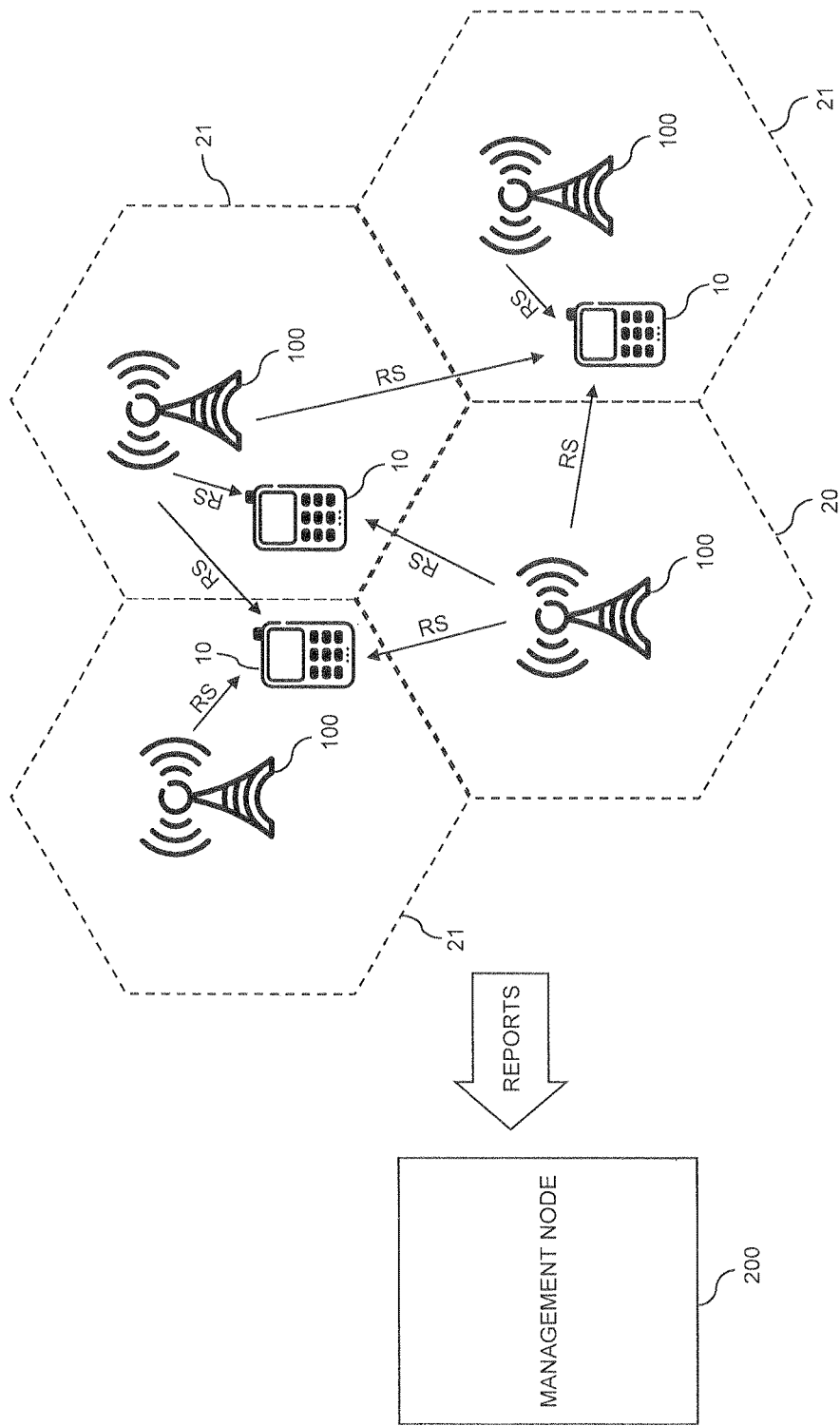
FIG. 1 schematically illustrates a cellular network in which interferer classification of cells may be performed according to an embodiment of invention.

In the following, concepts according to embodiments of the invention will be explained in more detail by referring to the accompanying drawings. The illustrated concepts relate to management of a cellular network. Specifically, the concepts relate to determination of an indicator of a level of interference generated by a given cell of the cellular network with respect to one or more surrounding cells of the given cell. Such indicator may for example be used for assessing whether a tilt angle of an antenna used for serving the given cell requires adjustment. Such indicator may also, or alternatively, be used for assessing whether a transmit power of the given cell requires adjustment. The cellular network may for example be based on the LTE (Long Term Evolution) technology, UMTS (Universal Mobile Telecommunications System) technology, or GSM (Global System for Mobile Communications) technology specified by 3GPP ($3^{rd}$ Generation Partnership Project).

In the concepts as illustrated in the following, the indicator of the level of interference, in the following referred to as cell-level interference KPI (KPI: Key Performance Indicator), may be determined on the basis of measurements performed by communication devices, in the following referred to as UEs (UE: User Equipment), associated with cells surrounding the considered cell. These measurements indicate a signal strength of a signal received from the considered cell. Further, the measurements may indicate a signal strength of a signal received from the respective surrounding or neighboring cell(s). The measured signals may correspond to reference signals transmitted by the cells, and the measurements may thus indicate an RSRP (Reference Signal Received Power) of the respective cells. However, other representations of the signal strength could be utilized as well, e.g., an RSRQ (Reference Signal Received Quality). In the case of the UMTS radio technology, the signal strength may also be represented as a RSCP (Received Signal Code Power) or an Ec/No ratio. In the case of the GSM radio technology, the signal strength may also be represented as an RxLev (Reception Level) or RxQual (Reception Quality). The determined cell-level interference KPI may be represented in terms of a number of the surrounding cells, for which the considered cell is classified as a relevant interferer. The considered cell may be classified as a relevant interferer, if the measurements show that the considered cell generates interference, e.g., because the difference between the measured strength of the signal from the considered cell and the measured strength of the signal from the surrounding cell is below a threshold, but the considered cell is not classified as a relevant neighbor, i.e., a relevant candidate for a handover (HO) from the surrounding cell to the considered cell.

The cell-level interference KPI may be determined in a centralized manner, by collecting and evaluating the measurements in a centralized node, such as a management node or an access node serving the considered cell. Further, the cell-level interference KPI may be determined in a distributed manner by cooperation of access nodes serving the considered cell and its surrounding cells. Such access nodes may for example correspond to base stations, e.g., an NB (Node B) of the UMTS technology or an eNB (evolved Node B) of the LTE technology. Further, the access nodes may correspond to control nodes, such as an RNC (Radio Network Controller) of the UMTS technology.

The cell-level interference KPI may be utilized as a basis for adjusting an antenna tilt angle of an antenna used for serving the considered cell. For example, a high value of the cell-level interference KPI may indicate that the antenna should be downtilted, i.e., the main radiation direction of the antenna shifted toward the ground. The cell-level interference KPI may also be utilized as a basis for adjusting a transmit power of the considered cell. For example, a high value of the cell-level interference KPI may indicate that a lower maximum transmit power limit should be utilized for the considered cell. In some scenarios, the antenna tilt angle and/or transmit power of the considered cell may be automatically controlled on the basis of the cell-level interference KPI.

FIG. 1 schematically illustrates exemplary structures of the cellular network, which may be involved in the determination and utilization of the cell-level interference KPI. By way of example, FIG. 1 illustrates multiple cells 20, 21 of the cellular network and access nodes 100 serving the cells 20, 21. In the following, it is assumed that the cell 20 is considered for determination of the cell-level interference KPI, and the cells 21 are illustrated as exemplary surrounding cells of the cell 20. However, it is to be understood that the cell-level KPI could be determined for any cell 20, 21 of the cellular network. In FIG. 1, the surrounding cells 21 are illustrated as direct neighbors of the cell 20. However, in some cases also surrounding cells which are not directly neighboring the cell 20 could be taken into account.

FIG. 1 further illustrates a number of UEs 10 which are associated with the surrounding cells 21. Here, association of the UE 10 with a certain surrounding cell may correspond to the UE 10 being connected to the surrounding cell 21 or may correspond to the UE 10 camping in idle mode in the surrounding cell 21. The association of a UE 10 with the surrounding cell 21 is assumed to imply certain reporting of measurements to the access node 100 of the surrounding cell, in particular measurements of reference signals RS. As illustrated, each communication device 10 may receive the reference signals RS from the cell 21 to which it is associated, but also from other cells 20, 21. A report by the UE 10 may thus include the following elements: an identifier of the cell 21 to which the UE 21 is associated, the RSRP measured with respect to this cell 21, and one or more RSRPs measured with respect to other cells 20, 21 and corresponding identifiers of these other cells 20, 21. The identifiers may for example be represented by a PCI (Physical Cell Identity) or the like. These measurements may then be evaluated, in a centralized or distributed manner, to determine the cell-level interference KPI for the cell 20.

Figure 2:
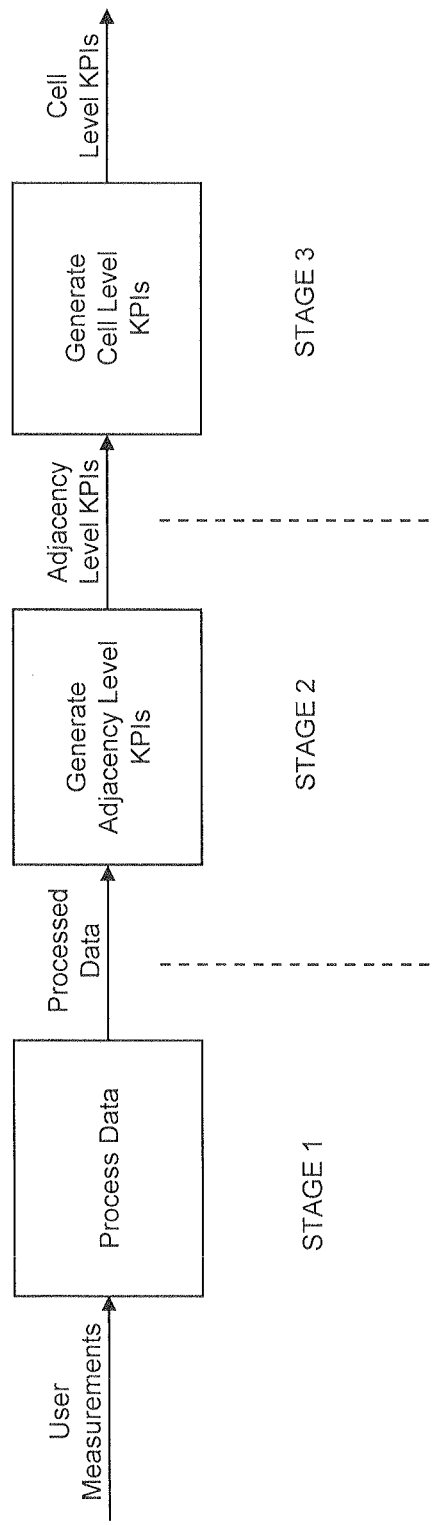
FIG. 2 schematically illustrates an interferer classification process according to an embodiment of the invention.

FIG. 2 schematically illustrates a process for determining the cell-level interference KPI. As illustrated, the process may involve a first stage (STAGE 1), a second stage (STAGE 2), and a third stage (STAGE 3).

The measurements from the UEs are processed in the first stage. This may for example involve counting events in which the reporting UE experiences interference from another cell which is not a candidate for a HO. Further, also events may be counted in which the reporting UE experiences interference from another cell, but this cell is a candidate for a HO. As a result, for the measurements originating from a certain cell, in the following referred to as source cell, and for each other cell covered by these measurements, in the following referred to as target cell, a count of events may be provided in which a UE associated with the source cell experiences interference from the target cell, but the other cell is not a candidate for a HO. Further, for the measurements originating from the source cell, and for each target cell, a count of events may be provided in which a UE associated with the source cell experiences interference from the target cell, but the target cell is a candidate for a HO. The processing of the first stage is typically performed for all available source cells.

In the second stage, the counts from the first stage may be evaluated statistically to classify the target cells either as relevant interferer of the source cell or as relevant neighbor. This may be accomplished by considering the counts in relation to a total number of evaluated measurements and by comparison to threshold values. As a result, adjacency-level KPIs may be generated for the source cell with respect to each target cell. One type of such adjacency-level KPI may indicate whether the target cell is classified as relevant interferer of the source cell. Another type of such adjacency-level KPI may indicate whether the target cell is classified as relevant neighbor of the source cell, i.e., a relevant candidate for HOs from the source cell.

In the third stage, the adjacency-level KPIs may be evaluated to determine the cell-level interference KPI. Further, also a cell-level HO relevance KPI may be determined. For this purpose, each of the target cells may be considered for which adjacency-level KPIs were obtained in the second stage. The cell-level interference KPI may be determined on the basis of a number of the source cells, for which the adjacency-level KPIs indicate that they are classified as relevant interferer of the considered cell. The cell-level HO relevance KPI may be determined on the basis of a number of the source cells, for which the adjacency-level KPIs indicate that they are classified as relevant neighbor of the considered cell. In the following, it is assumed that the cell-level interference KPI is represented by the number of the source cells, for which the adjacency-level KPIs indicate that they are classified as relevant interferer of the considered cell, and that the cell-level HO relevance KPI is represented by the number of the source cells, for which the adjacency-level KPIs indicate that they are classified as relevant neighbor of the considered cell.

As a general rule, in a centralized implementation all stages of the process of FIG. 2 may be performed by the same node, e.g., a management node which is responsible for managing at least those cells which are source cells or target cells of the measurements. In a distributed implementation, the processing of the first stage, the second stage, and the third stage may be performed by different nodes, e.g., different access nodes of the cellular network. For example, the processing of the first stage and of the second stage may be performed by the access node of serving the source cell, and the adjacency-level KPIs may then be indicated to the access nodes of the respective target cells. The latter access nodes may then perform the processing of the third stage to determine the cell-level KPI(s) for their own cell.

Exemplary processes and evaluations performed in the first stage, the second stage, and the third stage will now be explained in more detail with reference to FIGS. 3 to 5.

Figure 3:
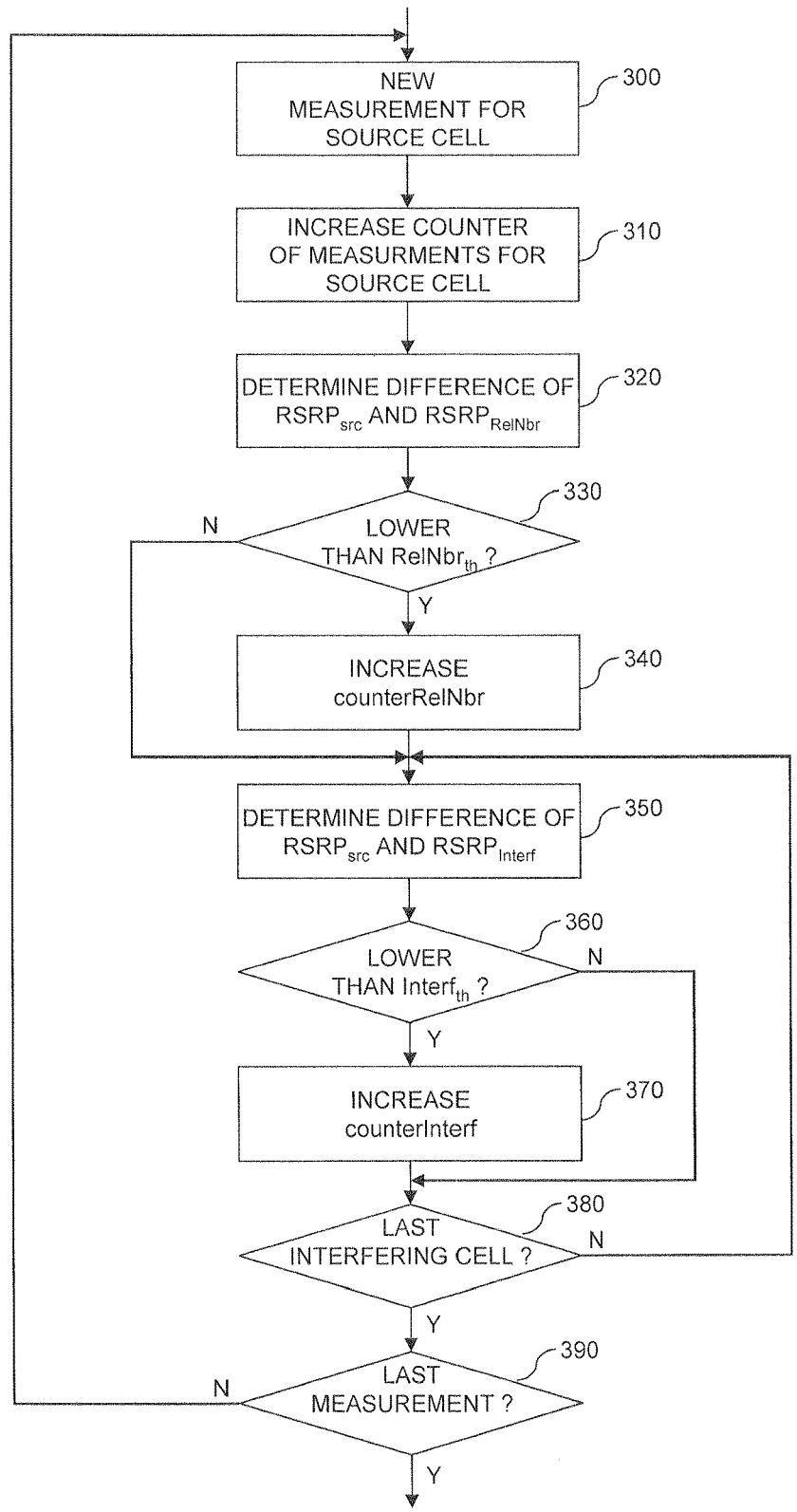
FIG. 3 shows a flowchart for illustrating a first stage of the interferer classification process.

FIG. 3 shows exemplary processes which may be performed in the first stage.

At step 300, a certain measurement is obtained. This measurement may be part of a set of measurements performed during a certain time period, in the following referred to as ROP (Report Output Period). As mentioned above, the measurements may be reported by UEs associated with different cells. Each measurement may be reported in a separate report, or reporting of multiple measurements may be aggregated in one report.

At step 310, a number of reported measurements is calculated with respect to each source cell identified by src by incrementing a counter NumSamplesRsrp(src) according to $$\text{NumSamplesRsrp}(src) = \text{NumSamplesRsrp}(src) + 1 \qquad (1)$$

As mentioned above, the measurement obtained at step 300 may indicate the RSRP for the source cell, in the following referred to as $\text{RSRP}_{src}$, and multiple RSRPs for different target cells. At step 320, the target cell having the highest RSRP is identified as the most promising candidate for a HO from the source cell, and the difference between $RSRP_{src}$ and this highest RSRP, referred to as $RSRP_{RelNbr}$, is calculated.

At step 330, the difference calculated at step 320 is compared to a threshold, referred to as $RelNbr_{th}$. The threshold $RelNbr_{th}$ may reflect whether the difference between $RSRP_{src}$ and $RSRP_{RelNbr}$ is still sufficiently large so that a HO from the source cell will typically not be triggered. If the difference is below $RelNbr_{th}$, the target cell is considered as a HO candidate and the process continues with step 340, as indicated by branch "Y". Otherwise, the process continues with step 350, as indicated by branch "N".

At step 340, an adjacency-level counter for the source cell, identified by src, and for the considered target cell, identified by trgt, referred to as counterRelNbr(src, trgt), is incremented by 1 according to:

$$\text{counterRelNbr}(src,trgt) = \text{counterRelNbr}(src,trgt) + 1. \quad (2)$$

At step 350, one of the target cells not having the highest RSRP is considered as a potential interferer, and the difference between $RSRP_{src}$ and the RSRP of this target cell, referred to as $RSRP_{Interf}$, is calculated.

At step 360, the difference calculated at step 350 is compared to a threshold, referred to as $Interf_{th}$. The threshold $Interf_{th}$ may reflect whether the difference between $RSRP_{src}$ and $RSRP_{Interf}$ is still sufficiently large so that an impact by interference from the target cell is typically not expected. If the difference is below $Interf_{th}$, the target cell is considered at a interferer and the process continues with step 370, as indicated by branch "Y". Otherwise, the process continues with step 380, as indicated by branch "N".

At step 370, an adjacency-level counter for the source cell, identified by src, and for the considered target cell, identified by trgt, referred to as counterInterf(src, trgt), is incremented by 1 according to:

$$\text{counterInterf}(src,trgt) = \text{counterInterf}(src,trgt) + 1. \quad (3)$$

At step 380, it is checked whether the target cell considered in steps 350, 360, and 370 was the last one of the target cells not having the highest RSRP, i.e., the last potential interferer covered by the currently processed measurement. If this is the case, the process continues with step 380, as indicated by branch "Y". If this is not the case, the process returns to step 350 to consider a further one of the target cells not having the highest RSRP as a potential interferer.

At step 390, it is checked whether the measurement processed in steps 300, 310, 320, 330, 340, 350, 360, 370, and 380 was the last measurement from the ROP. If this is the case, the process continues to the next stage, as indicated by branch "Y". If this is not the case, the process returns to step 300 to consider a further measurement from the ROP.

A results of the process of FIG. 3 thus include, for each source cell, the number of evaluated measurements, given by NumSamplesRsrp(src). Further, the results include, for each adjacency pair of source cell and target cell, the number of measurements where a target cell was considered as a candidate for a HO from the source cell, given by the counter counterRelNbr(src, trgt), and the number of measurements where the target cell was considered as an interferer of the source cell, given by the counter counterInterf(src, trgt).

Figure 4:
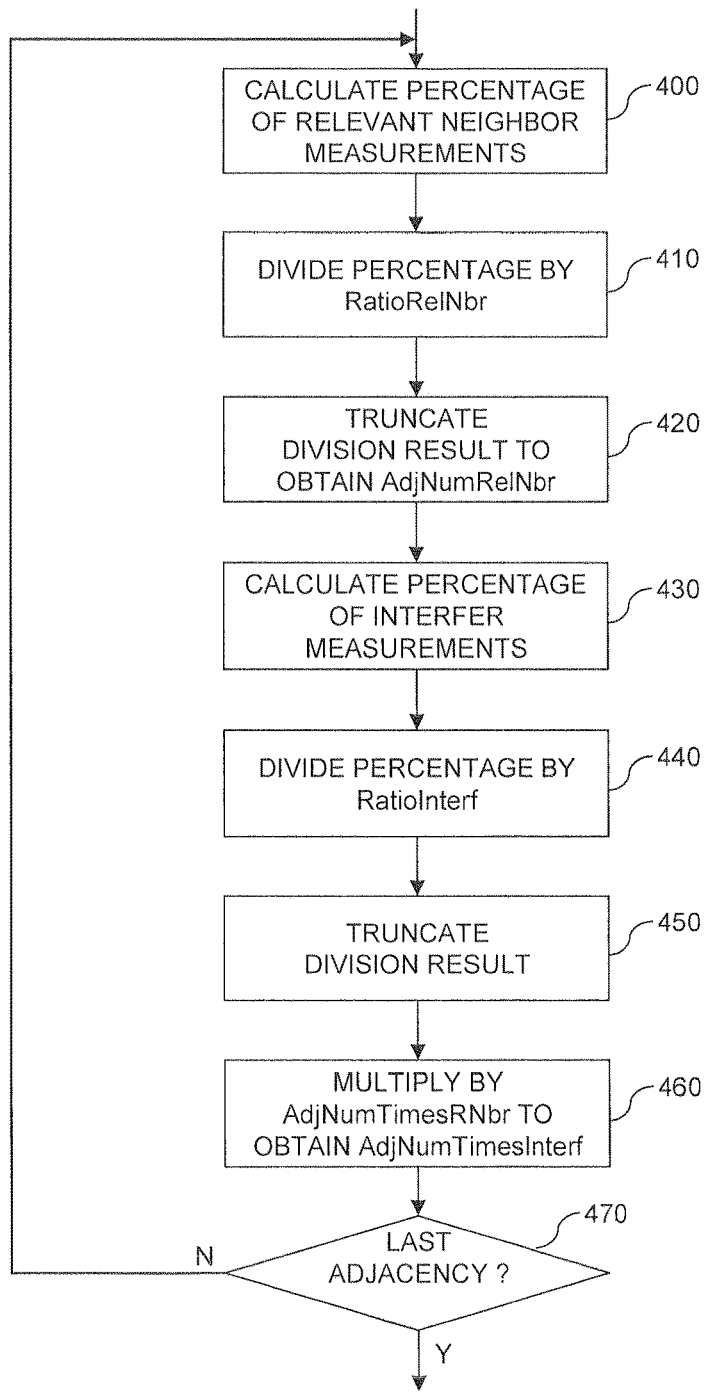
FIG. 4 shows a flowchart for illustrating a second stage of the interferer classification process.

FIG. 4 shows exemplary processes which may be performed in the second stage. These processes have the purpose of utilizing the results from the first stage for calculating a first adjacency-level KPI, referred to as AdjNumTimesRelNbr(src, trgt), and a second adjacency-level KPI, referred to as AdjNumTimesInterf(src, trgt). The adjacency-level KPI AdjNumTimesRelNbr(src, trgt) indicates if a target cell, identified by trgt, is classified as a relevant neighbor of a source cell, identified by src, i.e., as a relevant candidate for a HO from the source cell. Here, the attribute "relevant" indicates that in a significant percentage of the evaluated measurements the target cell was considered as a HO candidate. The adjacency-level KPI AdjNumTimesInterf(src, trgt) indicates if a target cell, identified by trgt, is classified as a relevant interferer cell of a source cell, identified by src. Here, the attribute "relevant" indicates that in a significant percentage of the evaluated measurements the target cell was considered as an interferer.

At step 400, the counter counterRelNbr(src, trgt) obtained in the first stage is divided by the total number of evaluated measurements for the source cell, NumSamplesRsrp(src), to obtain a ratio given by:

$$\text{AdjNumTimesRelNbr\_tmp\_1}(src, tgt) = \frac{\text{counterRelNbr}(src, tgt)}{\text{NumSamplesRsrp}(src)}. \quad (4)$$

The ratio AdjNumTimesRelNbr_tmp_1(src, trgt) corresponds to a percentage of measurements where the target cell, identified by trgt, was considered as a HO candidate from the source cell, identified by src.

At step 410, the percentage AdjNumTimesRelNbr_tmp_1 (src, trgt) is divided by a threshold, referred to as RatioRelNbr, to obtain a ratio given by:

$$\text{AdjNumTimesRelNbr\_tmp\_2}(src, tgt) = \frac{\text{AdjNumTimesRelNbr\_tmp\_1}(src, tgt)}{\text{RatioRelNbr}}. \quad (5)$$

The threshold RatioRelNbr defines a minimum percentage of measurements to consider the target cell as a relevant HO candidate.

At step 420, the ratio AdjNumTimesRelNbr_tmp_2(src, trgt) is truncated to a maximum value of 1, to obtain the KPI AdjNumTimesRelNbr(src, trgt). This may be accomplished according to:

$$\text{AdjNumRelNbr}(src,tgt) = \min(1, \text{AdjNumTimesRelNbr\_tmp\_2}(src,tgt)). \quad (6)$$

By the truncation of step 420, it can be taken into account that all values of equal to or larger than 1 indicate that the target cell is a relevant HO candidate, i.e., have the same significance, and that a further distinction between "more relevant" or "less relevant" is not intended. Accordingly, the KPI AdjNumTimesRelNbr(src, trgt) ranges from 0 to 1. A value of AdjNumTimesRelNbr(src,tgt)=1 indicates that the target cell, identified by trgt, is a relevant neighbor of the source cell, identified by src.

Relations (4), (5), and (6) may also be combined to obtain the value of AdjNumTimesRelNbr(src,tgt) by a single calculation according to:

$$\text{AdjNumTimesRelNbr}(src, tgt) = \min\left(1, \frac{\text{counterRelNbr}(src, tgt)}{\text{NumSamplesRsrp}(src) \cdot \text{RatioRelNbr}}\right). \quad (7)$$

At step 430, the counter counterInterf(src) obtained in the first stage is divided by the number of evaluated measurements for the source cell, NumSamplesRsrp(src), to obtain a ratio given by:

$$\text{AdjNumTimesInterf\_tmp\_1}(src, tgt) = \frac{counterInterf(src, tgt)}{NumSamplesRsrp(src)}. \quad (8)$$

The ratio AdjNumTimesInterf_tmp_1(src, trgt) corresponds to a percentage of measurements where the target cell, identified by trgt, was considered as an interferer of the source cell, identified by src.

At step 440, the percentage AdjNumTimesInterf_tmp_1 (src, tragt) is divided by a threshold, referred to as RatioInterf, to obtain a ratio given by:

$$\text{AdjNumTimesInterf\_tmp\_2}(src, tgt) = \quad (9)$$
$$\frac{\text{AdjNumTimesInterf\_tmp\_1}(src, tgt)}{RatioInterf}.$$

The threshold RatioInterf defines a minimum percentage of measurements to consider the target cell as a relevant interferer.

At step 450, the ratio AdjNumTimesInterf_tmp_3(src, trgt) is truncated to a maximum value of 1, to obtain a value:

AdjNumTimesInterf_tmp_3(src,tgt)=min(1,AdjNumTimesInterf_tmp_2(src,tgt)) (10)

By the truncation of step 450, it can be taken into account that all values of equal to or larger than 1 indicate that the target cell is a relevant interferer, i.e., have the same significance, and that a further distinction between "more relevant" or "less relevant" is not intended. Accordingly, the value AdjNumTimesInterf_tmp_3 ranges from 0 to 1. A value of AdjNumTimesInterf_tmp_3(src,tgt)=1 indicates that the neighbor cell tgt is considered as a relevant interferer of the source cell.

At step 460, it is taken into account that if a neighbor cell is classified as a relevant neighbor cell, it cannot be considered as a relevant interferer cell. For this purpose, AdjNumTimesInterf_tmp_3(src, trgt) is multiplied by the complement of the KPI AdjNumTimesRelNbr(src, trgt) calculated for this adjacency, to obtain the KPI AdjNumTimesInterf(src, trgt) according to:

AdjNumTimesInterf(src,tgt)=(1−AdjNumTimesRelNbr(src,tgt))·AdjNumTimesInterf_tmp_3(src,tgt) (11)

Relations (8), (9), (10), and (11) may also be combined to obtain the value of AdjNumTimesInterf(src,tgt) by a single calculation according to:

$$AdjNumTimesInterf(src, tgt) = (1 - AdjNumTimesRelNbr(src, tgt)) \cdot \quad (12)$$
$$\min\left(1, \frac{counterInterf(src, tgt)}{NumSamplesRsrp(src) * RatioInterf}\right)$$

At step 470, it is checked whether the adjacency pair of the source cell identified by src and the target cell identified by trgt as evaluated in steps 400, 410, 420, 430, 440, 450, and 460 was the last available adjacency pair obtained from the first stage. If this is the case, the process continues with the next stage, as indicated by branch "Y". Otherwise, the process returns to step 400 to evaluate a further adjacency pair, as indicated by branch "N".

As a result of the processes of FIG. 4, the adjacency-level KPI AdjNumTimesRelNbr(src, trgt) and the adjacency-level KPI AdjNumTimesInterf(src, trgt), is obtained for each adjacency pair of a source cell and a target cell.

Figure 5:
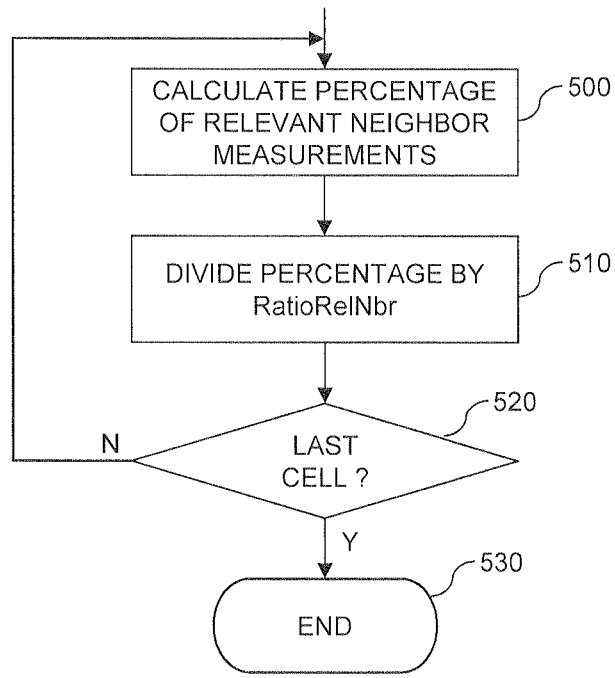
FIG. 5 shows a flowchart for illustrating a third stage of the interferer classification process.

FIG. 5 shows exemplary processes which may be performed in the third stage. These processes have the purpose of utilizing the results from the second stage for calculating a first cell-level KPI, referred to as NumTimesRelNbr, and a second cell-level KPI referred to as NumTimesInterf. For this purpose, for each considered cell, those adjacency-level KPIs from the second stage are aggregated in which the considered cell is the target cell, i.e., a classified as a relevant neighbor or as a relevant interferer.

The cell-level KPI NumTimesRelNbr shows how many other cells have classified the considered cell as a relevant neighbor. At step 500, the cell-level KPI NumTimesRelNbr is determined by aggregating the adjacency-level KPI AdjNumTimesRelNbr(src, trgt) in which the considered cell is identified as the target cell trgt. For each of such KPI, the value of NumTimesRelNbr is incremented by 1.

The cell-level KPI NumTimesInterf shows how many other cells have classified the considered cell as a relevant interferer. At step 510, the cell-level KPI NumTimesInterf is determined by aggregating the adjacency-level KPI AdjNumTimesInterksrc, trgt) in which the considered cell is identified as the target cell trgt. For each of such KPIs, the value of NumTimesInterf is incremented by 1.

At step 520, it is checked whether the cell considered in steps 500 and 510 was the last cell for which adjacency-level KPIs are available from the second stage. If this is the case, the process ends, as indicated by branch "Y" and step 520. Otherwise, the process returns to step 500 to consider a cell, as indicated by branch "N". Accordingly, the cell-level KPIs may be obtained for all cells for which sufficient measurements from the UEs could be obtained.

It is noted out that for many applications, the KPI NumTimesInterf is sufficient and that determination of the KPI NumTimesRelNbr may thus be omitted.

In the following, an example of utilizing cell-level KPIs indicator is presented with reference to FIGS. 6, 7, and 8. In theses examples, specifically the significance of the cell-level KPIs for characterizing overshooting of a cell is addressed. For this purpose, the cell-level KPIs were calculated on the basis of measurement data obtained from an LTE network consisting of a cluster of 126 cells (defining 14247 adjacencies), using a carrier of 734 MHz with 10 MHz bandwidth. The ROP used to collect the values of the cell-level KPIs was one hour. The values represented in FIGS. 6, 7, and 8 were subjected to further averaging of multiple ROPs over one day. The parameters used in the calculations were RelNbr$_{th}$=∞, Interf$_{th}$=6 dB, RatioRelNbr=10%, and RatioInterf=5%. These values have been defined by analyzing RSRP measurements of many different networks. In this example, the threshold RelNbr$_{th}$ is infinite. This ensures that the surrounding cell having the highest RSRP is always considered as a HO candidate, even if its RSRP is extremely low compared with the RSRP of the serving cell.

Figure 6:
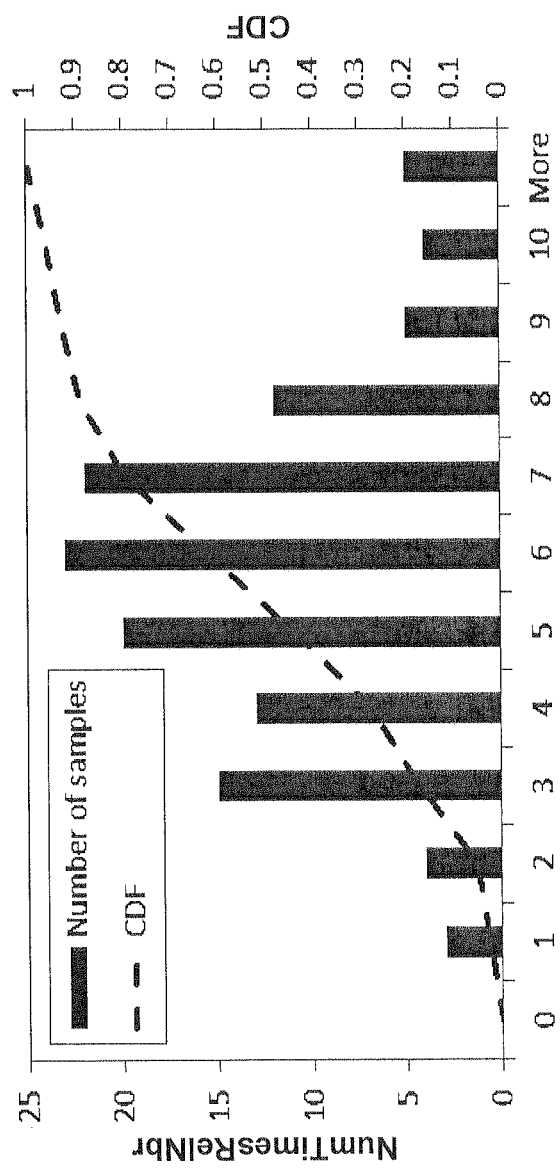
FIG. 6 shows exemplary results of an interferer classification process according to an embodiment of the invention.
Figure 7:
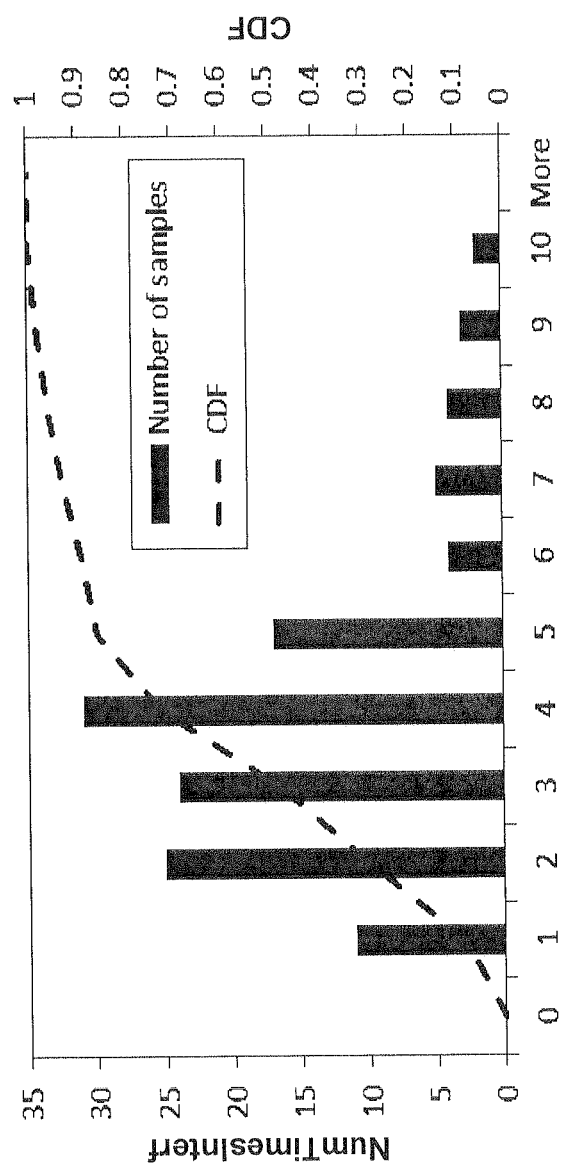
FIG. 7 shows further exemplary results of an interferer classification process according to an embodiment of the invention.

FIGS. 6 and 7 present a histogram (on the left axis) and a Cumulative Distribution Function (CDF) (on the right axis) of the cell-level KPIs NumTimesRelNbr and NumTimesInterf, respectively. It can be observed that the median value of NumTimesRelNbr (i.e., the number of cells for which a the cell is a relevant neighbor) is 5. Nonetheless, some cells show extreme values of NumTimesRelNbr. Likewise, the median value of NumTimesInterf (i.e., the number of other cell for which the cell is classified as a relevant interferer) is 3. Some cells are classified as relevant interferers of more than 10 cells, without being a relevant neighbor of these cells. For these cells with large values of NumTimesInterf downtilting of the antenna or reduction of transmit power may be considered. It can be expected that there is only a small likelihood of causing coverage problems by these actions, because the cell constituting the relevant interferer of the other cells is not a relevant neighbor of the other cells.

Further, FIG. 7 shows that only 15% of cells in the trial area have a value of NumTimesInterf which is larger than 5. In this example, the value of 5 may thus constitute of a threshold above which cells may be selected for downtilting or transmit power reduction.

Figure 8:
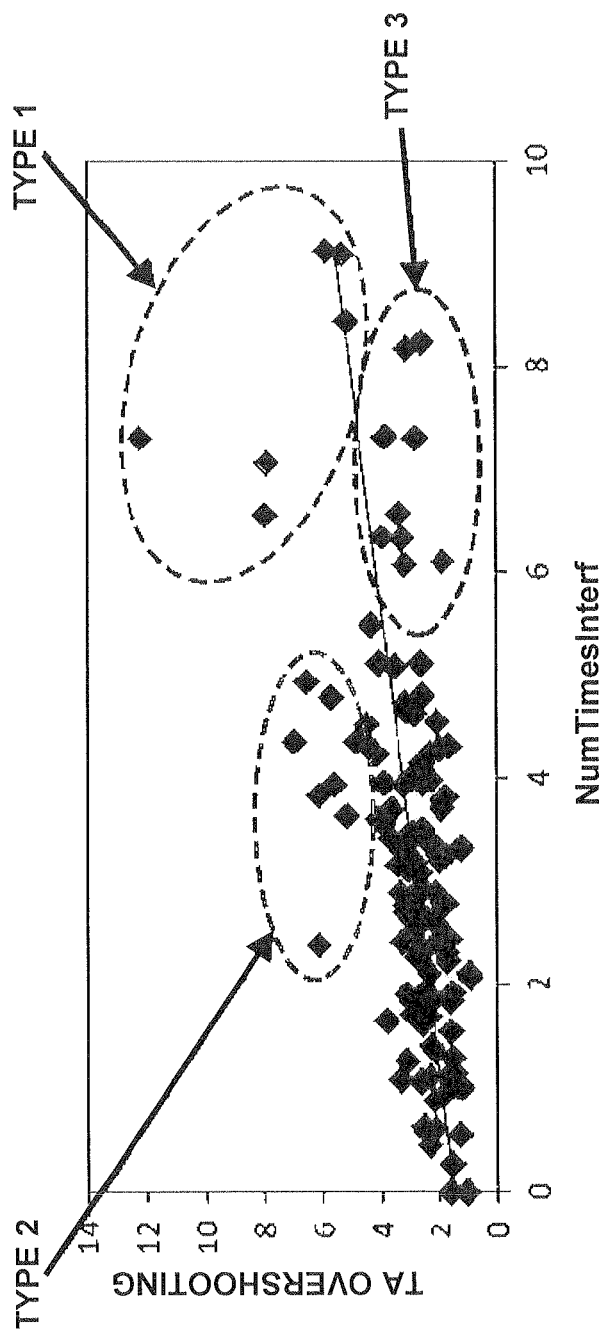
FIG. 8 shows exemplary data for demonstrating significance of an indicator obtained by an interferer classification process according to an embodiment of the invention.

FIG. 8 shows a correlation between the cell-level KPI NumTimesInterf and a TA overshooting indicator based on timing advance (TA) measurements, such as discussed in "Impact of antenna downtilting on network performance in GERAN system", by Wille et al., in IEEE Communication Letters, July 2005, vol. 9, no. 7, pp. 598-600. Each point in the diagram represents the values of the different indicators for one day in one cell. It can be observed that, in many cells, both indicators are fairly correlated. Thus, cells with the largest value of the NumTimesInterf are often those with the largest value of the TA overshooting indicator. Accordingly, the cell-level KPI NumTimesInterf provides at least similar information as the TA overshooting indicator. However, there are some cells where both indicators give completely different information. A closer analysis of the cells, reveals that three different types of cells may be distinguished, in the figure identified by type 1, type 2, and type 3.

The cells of type 1 have large values of both indicators. The large value of the TA overshooting indicator shows that these cells are capturing UEs located far away, and the large value of NumTimesInterf shows that these cells are relevant interferers for a large number of neighbor cells. Accordingly, both KPIs provide a similar information and these cells can be considered as overshooting cells on the basis of both indicators.

For the cells of type 2, the TA overshooting indicator is much larger than NumTimesInterf. This may have the following reasons: A) The antenna of the base station aims at a distant region not covered by any surrounding cell. This may for example be the case for a cell at the border of an urban region. In this case, the TA overshooting indicator is large, because the measured TA is large compared to average inter-site distance, which might be incorrectly interpreted as cell overshooting. If this cell would be downtilted, a coverage problem may occur. By contrast, NumTimesInterf in this scenario cell would be low, indicating that this cell does not interfere neighbor cells. Thus, on the basis of the KPI NumTimesInterf, this cell could be correctly identified as non-overshooting. B) The antenna of the base station aims outside the cluster, causing that interfered neighbors fall outside the trial area. As these cells are not included in the area where measurements are collected, NumTimesInterf is not as large as it should be. This is just a border effect, which is solved by enlarging the area where measurements are collected and of minor importance in practical scenarios, where typically measurements would be collected from large clusters.

For the cells of type 3, the TA overshooting indicator is small, but NumTimesInterf is large. The large value of NumTimesInterf (more than 6) shows that these cells have large coverage areas, as they overlap with many other cells for which they are not relevant neighbors. However, the small value of the TA overshooting indicator (less than 2) indicates that these cells are not capturing distant traffic (compared to the average inter-site distance), even if they provide coverage (i.e., signal level) in distant areas. This indicates that any the cells of type 3 generate useless signal levels (i.e., interference) in many other cells, which means that they are overshooting and for example should be downtilted. For the cells of type 3, the TA overshooting indicator would suggest to maintain antenna tilt, while the KPI NumTimesInterf would suggest to downtilt the antenna, which would be the correct action. Again, the likelihood of causing coverage holes in interfered cells is small, as the cell detected as overshooter has proved not to be a relevant neighbor of the interfered cells.

Accordingly, the cell-level KPIs as described herein may offer a more precise characterization of overshooting behavior.

Figure 9:
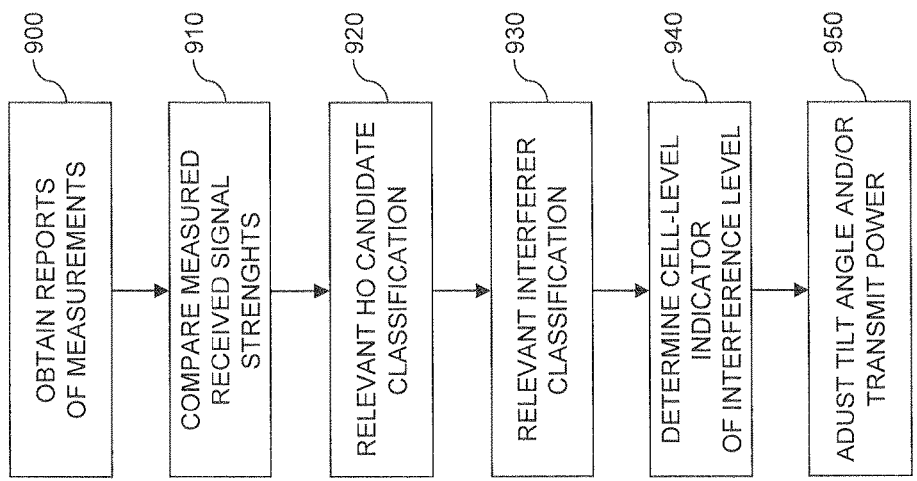
FIG. 9 shows a flowchart for illustrating a method according to an embodiment of the invention, which may be used for implementing the interferer classification process in a centralized approach.

FIG. 9 shows a flowchart for illustrating a method of managing a communication network, e.g., having structures as illustrated in FIG. 1. The method of FIG. 9 may be used for implementing the above-described concepts in a node of the cellular network. In the method of FIG. 9, it is assumed that the node may implement all the above-mentioned stages of the process for determining the cell-level interference KPI. This may for example be the case if the node is a management node which is responsible for managing a given cell and surrounding cells of the given cell, as explained for the management node 200 of FIG. 1. This may also be the case if the node is an access node serving a given cell which is surrounded by multiple surrounding cells, such as the base station 100 or another access type of access node of the cell 20 of FIG. 1. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 900, the node obtains reports of measurements for a given cell, such as the cell 20. The measurements are performed by one or more communication devices, such as the UEs 10, associated with a surrounding cell of the given cell, such as one of the cells 21. Each measurement indicates a received signal strength of a signal from the given cell. The signal may for example be a reference signal, and the strength may be indicated in terms of an RSRP. The node may receive the reports from access nodes serving the surrounding cells.

In some scenarios, each measurement may further indicate a received signal strength of a signal received from the surrounding cell to which the communication device is associated. Also in this case, the signal may be a reference signal, and the strength may be indicated in terms of an RSRP.

On the basis of the received signal strengths, the node may then determining a level of interference generated by the given cell with respect to said surrounding cell. This level of interference may for example be expressed in terms of the above-mentioned adjacency level KPI AdjNumTimesInterf(src, trgt) or in terms of the above-mentioned cell-level KPI NumTimesInterf.

At step 910, the node may compare the measured strength of the signal received from the given cell to the measured strength of the signal from the surrounding cell to which the communication device is associated. This may for example involve calculating a difference between the received signal strength of the signal from the given cell and the received signal strength of the signal from the surrounding cell to which the communication device is associated, as for example explained in connection with steps 320 and 350 of FIG. 3.

At step 920, the node may classify whether the given cell is a candidate for a HO from the surrounding cell. This may be accomplished on the basis of the difference calculated at step 910. The classification of step 920 may involve comparing the difference to a threshold, such as explained in connection with step 330 of FIG. 3. Further, this may involve incrementing a counter in response to the difference being below the threshold, such as explained in connection with step 340 of FIG. 3.

In some scenarios, each measurement may further indicate received signal strengths of signals from one or more further cells of the cellular network, e.g., again in terms of an RSRP. The node may then check, for each measurement, whether the received signal strength of the signal from said given cell is higher than the received signal strengths of the signals from the one or more further cells and increment of the counter only if the received signal strength of the signal from the given cell is higher than the received signal strengths of the signals from the one or more further cells. An example of such check is the selection of the target cell having the highest RSRP, as explained in connection with step 320 of FIG. 3.

Further, the node may determine a ratio of a value of the counter and a total number of the measurements with respect to said given cell, such as explained in connection with step 400 of FIG. 4. The node may then use this ratio and a configured threshold percentage of measurements above which said given cell is classified as a relevant HO candidate to classify the given cell as a relevant candidate for a HO from the surrounding cell. An example of such classification is explained in connection with steps 410, and 420 of FIG. 4.

At step 930, the node may classify whether the given cell is a relevant interferer for a HO from the surrounding cell. This may be accomplished on the basis of the difference calculated at step 910. The classification of step 930 may involve comparing the difference to a threshold, such as explained in connection with step 360 of FIG. 3. Further, this may involve incrementing a further counter in response to the difference being below the threshold, such as explained in connection with step 370 of FIG. 3.

Further, if the measurement indicates received signal strengths of signals from one or more further cells of the cellular network, the node may check, for each measurement, whether any of the received signal strengths of the signals from the one or more further cells is higher than the received signal strength of the signal from the given cell. The node may increment the further counter only if any of the received signal strengths of the signals from said one or more further cells is higher than the received signal strength of the signal from said given cell. An example of such check is the selection of target cells not having the highest RSRP as explained in connection with step 350 of FIG. 3.

Further, the node may determine a ratio of a value of the further counter and a total number of the measurements with respect to said given cell, such as explained in connection with step 430 of FIG. 4. The node may then use this ratio and a configured threshold percentage of measurements above which said given cell is classified as a relevant interferer to classify the given cell as a relevant interferer of the surrounding cell. An example of such classification is explained in connection with steps 440, 450, and 460 of FIG. 4. The classification of step 930 may be represented in terms of the above-mentioned adjacency level KPI AdjNumTimesInterf (src, trgt).

As a result of steps 920 and 930, the node may classify the given cell as a relevant interferer of the surrounding cell only if the given cell is not classified as a relevant candidate for a HO from said surrounding cell.

At step 940, the node may determine a cell-level indicator of the interference level, such as the above-mentioned cell-level KPI NumTimesInterf. For this purpose, the node may perform, for each surrounding cell of the given cell, a determination whether the given cell is classified as a relevant interferer of the respective surrounding cell, e.g., on the basis of the above-mentioned adjacency level KPI AdjNumTimesInterf(src, trgt). On the basis of these determinations, the node may then determine the cell-level indicator indicating a level of interference generated by the given cell with respect to these surrounding cells. The indicator may represent a number of the surrounding cells for which the given cell is classified as a relevant interferer, as explained for the cell-level KPI NumTimesInterf.

At step 950, the node may utilize the indicator obtained at step 940 for adjusting an antenna tilt angle of the given cell. In some scenarios, this may involve automatically controlling the antenna tilt angle. Adjustment of the antenna tilt angle may be accomplished manually by personnel at the antenna site. Further, adjustment of the antenna tilt angle could be performed remotely by electrically controlling a beamform of the antenna and/or electrically controlling a mechanical actuator for tilting the antenna. Alternatively or in addition, the node may utilize the indicator obtained at step 940 for adjusting a transmit power of the given cell. In some scenarios, this may involve automatically controlling the transmit power.

Figure 10:
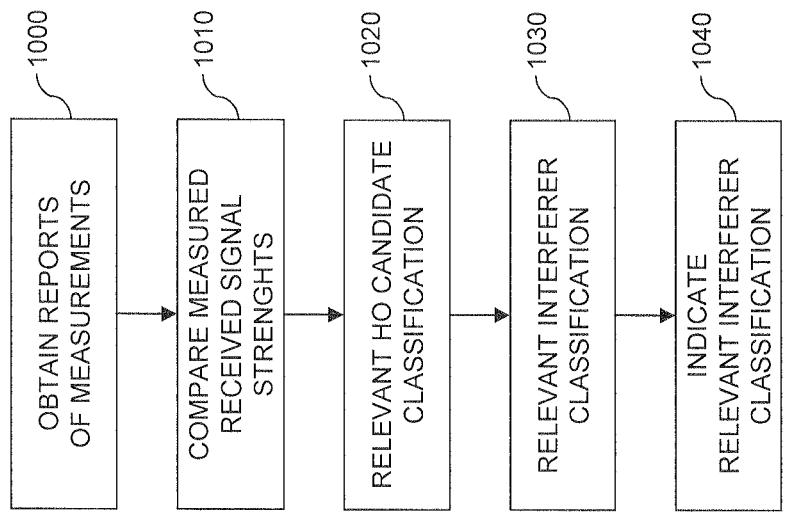
FIG. 10 shows a flowchart for illustrating a method according to an embodiment of the invention, which may be used for implementing the interferer classification process in a distributed approach.

FIG. 10 shows a flowchart for illustrating a further method of managing a communication network, e.g., having structures as illustrated in FIG. 1. The method of FIG. 10 may be used for implementing the above-described concepts in a node of the cellular network. In the method of FIG. 10, it is assumed that the node may implement the first two stages of the process for determining the cell-level interference KPI. This may for example be the case if the node is an access node of a surrounding cell of a given cell, e.g., one of the base stations 100 of the cell 21 as shown in FIG. 1. If a processor based implementation of the node is used, the steps of the method may be performed by one or more processors of the node. For this purpose, the processor(s) may execute correspondingly configured program code. Further, at least some of the corresponding functionalities may be hardwired in the processor(s).

At step 1000, the node obtains reports of measurements for a given cell, such as the cell 20. The measurements are performed by one or more communication devices, such as the UEs 10, associated with a surrounding cell of the given cell, such as one of the cells 21. Each measurement indicates a received signal strength of a signal from the given cell. The signal may for example be a reference signal, and the strength may be indicated in terms of an RSRP. If the node is an access node serving the surrounding cell, the node may receive the reports from the communication devices.

In some scenarios, each measurement may further indicate a received signal strength of a signal received from the surrounding cell to which the communication device is associated. Also in this case, the signal may be a reference signal, and the strength may be indicated in terms of an RSRP.

On the basis of the received signal strengths, the node may then determine a level of interference generated by the given cell with respect to said surrounding cell. This level of interference may for example be expressed in terms of the above-mentioned adjacency level KPI AdjNumTimesInterf (src, trgt).

At step 1010, the node may compare the measured strength of the signal received from the given cell to the measured strength of the signal from the surrounding cell to which the communication device is associated. This may for example involve calculating a difference between the received signal strength of the signal from the given cell and the received signal strength of the signal from the surrounding cell to which the communication device is associated, as for example explained in connection with steps 320 and 350 of FIG. 3.

At step 1020, the node may classify whether the given cell is a candidate for a HO from the surrounding cell. This may be accomplished on the basis of the difference calculated at step 1010. The classification of step 1020 may involve comparing the difference to a threshold, such as explained in connection with step 330 of FIG. 3. Further, this may involve incrementing a counter in response to the difference being below the threshold, such as explained in connection with step 340 of FIG. 3.

In some scenarios, each measurement may further indicate received signal strengths of signals from one or more further cells of the cellular network, e.g., again in terms of an RSRP. The node may then check, for each measurement, whether the received signal strength of the signal from said given cell is higher than the received signal strengths of the signals from the one or more further cells and increment of the counter only if the received signal strength of the signal from the given cell is higher than the received signal strengths of the signals from the one or more further cells. An example of such check is the selection of the target cell having the highest RSRP, as explained in connection with step 320 of FIG. 3.

Further, the node may determine a ratio of a value of the counter and a total number of the measurements with respect to said given cell, such as explained in connection with step 400 of FIG. 4. The node may then use this ratio and a configured threshold percentage of measurements above which said given cell is classified as a relevant HO candidate to classify the given cell as a relevant candidate for a HO from the surrounding cell. An example of such classification is explained in connection with steps 410, and 420 of FIG. 4.

At step 1030, the node may classify whether the given cell is a relevant interferer for a HO from the surrounding cell. This may be accomplished on the basis of the difference calculated at step 1010. The classification of step 1030 may involve comparing the difference to a threshold, such as explained in connection with step 360 of FIG. 3. Further, this may involve incrementing a further counter in response to the difference being below the threshold, such as explained in connection with step 370 of FIG. 3.

Further, if the measurement indicates received signal strengths of signals from one or more further cells of the cellular network, the node may check, for each measurement, whether any of the received signal strengths of the signals from the one or more further cells is higher than the received signal strength of the signal from the given cell. The node may increment the further counter only if any of the received signal strengths of the signals from said one or more further cells is higher than the received signal strength of the signal from said given cell. An example of such check is the selection of target cells not having the highest RSRP as explained in connection with step 350 of FIG. 3.

Further, the node may determine a ratio of a value of the further counter and a total number of the measurements with respect to said given cell, such as explained in connection with step 430 of FIG. 4. The node may then use this ratio and a configured threshold percentage of measurements above which said given cell is classified as a relevant interferer to classify the given cell as a relevant interferer of the surrounding cell. An example of such classification is explained in connection with steps 440, 450, and 460 of FIG. 4. The classification of step 1030 may be represented in terms of the above-mentioned adjacency level KPI AdjNumTimesInterf (src, trgt).

As a result of steps 1020 and 1030, the node may classify the given cell as a relevant interferer of the surrounding cell only if the given cell is not classified as a relevant candidate for a HO from said surrounding cell.

At step 1040, the node may indicate the classification obtained in steps 1020 and 1030 to one or more other nodes of the cellular network, e.g., to an access node serving the given cell. This node may then use the classification for assessing the level of interference generated by the given cell, e.g., by determining the above-mentioned cell-level KPI NumTimesInterf.

Figure 11:
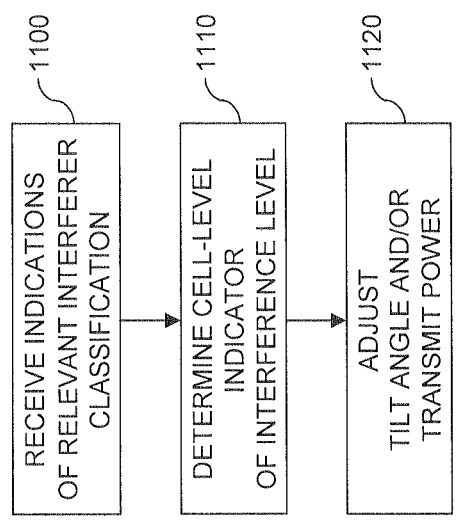
FIG. 11 shows a flowchart for illustrating a further method according to an embodiment of the invention, which may be used for implementing the interferer classification process in a distributed approach.

FIG. 11 shows a flowchart for illustrating a further method of managing a communication network, e.g., having structures as illustrated in FIG. 1. The method of FIG. 11 may be used for implementing the above-described concepts in an access node which serves a given cell of the cellular network. In the method of FIG. 11, it is assumed that the access node may implement the last stage of the process for determining the cell-level interference KPI. The access node may be a base station. The access node may for example correspond to the base station 100 of the cell 20 as shown in FIG. 1. However, the access node could also correspond to a control node responsible for controlling the base station 100, e.g., an RNC in a UMTS implementation. If a processor based implementation of the access node is used, the steps of the method may be performed by one or more processors of the node. For this purpose, the processor(s) may execute correspondingly configured program code. Further, at least some of the corresponding functionalities may be hardwired in the processor(s).

At step 1100, the access node serving the given cell receives, from access nodes serving one or more surrounding cells of the given cell, indications whether the given cell is classified as a relevant interferer of the respective surrounding cell. These indications may for example be received in terms of the above-mentioned adjacency level KPI AdjNumTimesInterf(src, trgt). The access nodes serving the surrounding cells may for example operate according to the method of FIG. 10.

At step 1110, the access node determines a cell-level indicator of a level of interference generated by the given cell with respect to the surrounding cells, such as the above-mentioned cell-level KPI NumTimesInterf. This is accomplished on the basis of the indications obtained at step 1100. The indicator determined at step 1110 may represent a number of the surrounding cells for which the given cell is classified as a relevant interferer, as explained for the cell-level KPI NumTimesInterf.

At step 1120, the node may utilize the indicator obtained at step 1110 for adjusting an antenna tilt angle of the given cell. In some scenarios, this may involve automatically controlling the antenna tilt angle. Adjustment of the antenna tilt angle may be accomplished manually by personnel at the antenna site. Further, adjustment of the antenna tilt angle could be performed remotely by electrically controlling a beamform of the antenna and/or electrically controlling a mechanical actuator for tilting the antenna. Alternatively or in addition, the node may utilize the indicator obtained at step 1110 for adjusting a transmit power of the given cell. In some scenarios, this may involve automatically controlling the transmit power.

Figure 12:
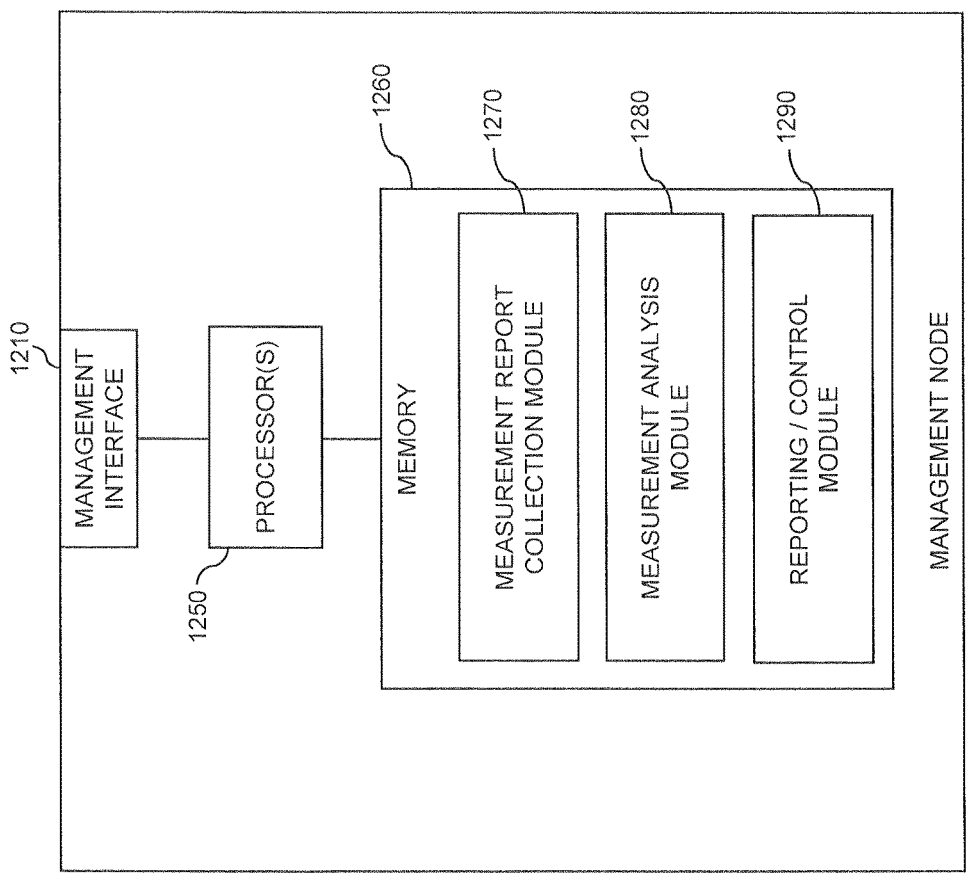
FIG. 12 schematically illustrates structures of a management node according to an embodiment of the invention.

FIG. 12 illustrates exemplary structures for implementing a management node for a cellular network. The management node may be configured to operate in accordance with the above-described concepts. For example, the illustrated structures may be used to implement the management node 200.

As illustrated, the management node may include a management interface 1210. The management interface 1210 may be used for obtaining reports of measurements performed by communication devices associated with cells of the cellular network.

Further, the management node includes one or more processor(s) 1250 coupled to the interface 1210, and a memory 1260 coupled to the processor(s) 1250. The memory 1260 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 1260 includes suitably configured program code modules to be executed by the processor(s) 1250 so as to implement the above-described functionalities of the management node, e.g., as illustrated by the method of FIG. 9. As illustrated, the program code modules in the the memory 1260 may include a measurement report collection module 1270 for so as to implement the above-described functionalities of obtaining measurements of received signal strengths from communication devices, e.g., as explained in connection with step 900 of FIG. 9. Further, the program code modules in the memory 1260 may include a measurement analysis module 1280 so as to implement the above-described functionalities of evaluating measurements to determine the adjacency-level KPIs or cell-level KPIs, e.g., as explained in connection with steps 920, 930, 940 of FIG. 9. Further the program code modules stored in the memory 1260 may include a reporting/control module 1290 so as to implement the above-described functionalities of controlling an antenna tilt angle or a transmit power on the basis of the determined cell-level KPIs. Further, the reporting/control module 1290 may also implement functionalities for reporting the determined KPIs, e.g., for assessment by operating personnel.

It is to be understood that the structures as illustrated in FIG. 12 are merely schematic and that the management node may actually include further components which, for the sake of clarity, have not been illustrated, e.g., further interfaces or further processors. Also, it is to be understood that the memory 1260 may include further types of program code modules, which have not been illustrated, e.g., program code modules for implementing known functionalities of a management node, e.g., functionalities of a user interface. In some implementations, also a computer program may be provided for implementing functionalities of the management node, e.g., in the form of a physical medium storing the program code modules to be stored in the memory 1260 or by making such program code available for download or streaming.

Figure 13:
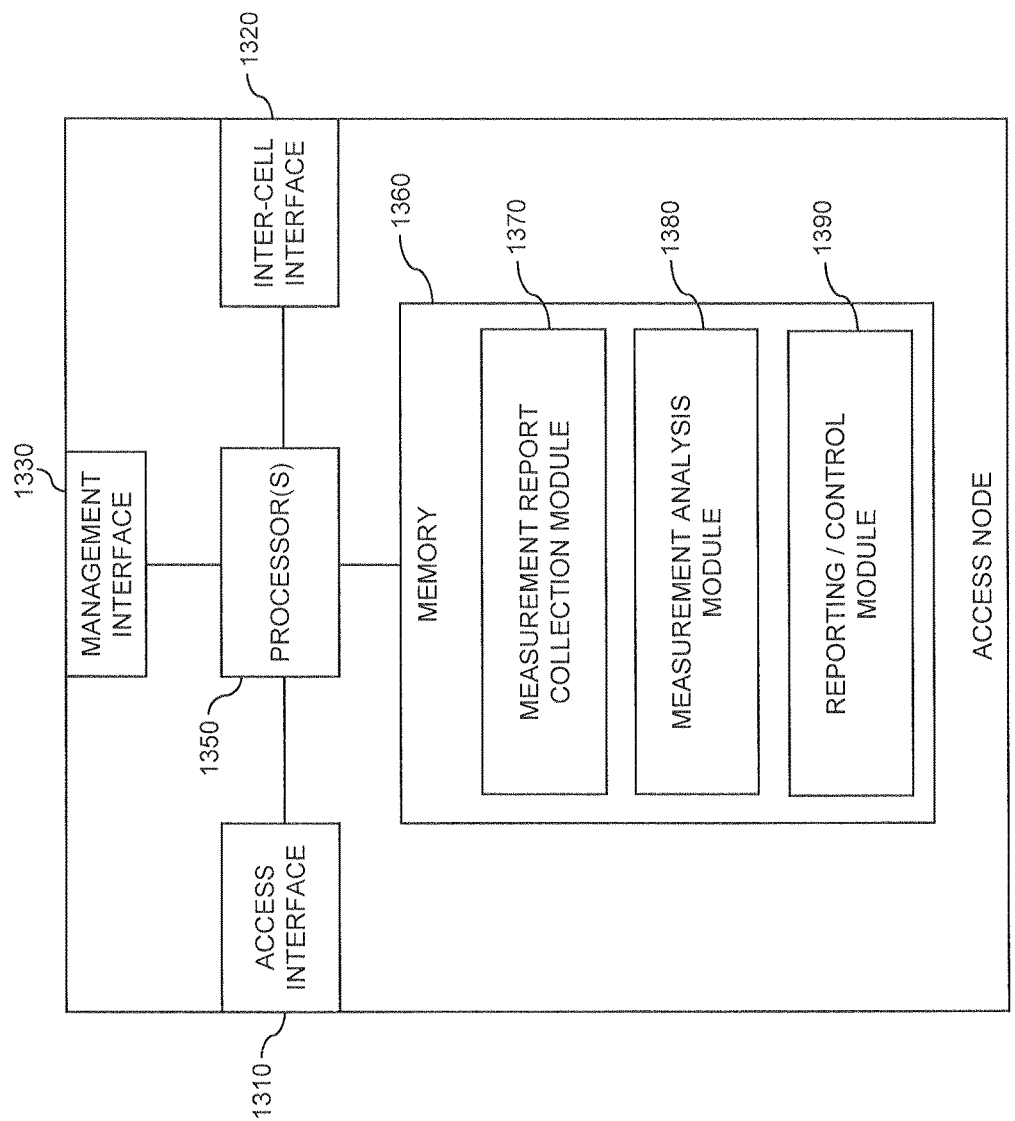
FIG. 13 schematically illustrates structures of an access node according to an embodiment of the invention.

FIG. 13 illustrates exemplary structures for implementing an access node for a cellular network. The access node may be configured to operate in accordance with the above-described concepts. For example, the illustrated structures may be used to implement the one of the base stations 100. In some scenarios, the access node may also correspond to a control node associated with a base station, such as an RNC of the UMTS technology.

As illustrated, the access node may include an access interface 1310. The access interface 1310 may be utilized for serving communication devices associated with a cell of the cellular network. If the access node corresponds to a base station, the access interface 1310 may be a radio interface. If the access node corresponds to a control node, the access interface 1310 may correspond to an interface to a base station. As further illustrated, the access node may include an inter-cell interface 1320. The inter-cell interface 1320 may be used for communication between different access nodes. For example, in the LTE technology the inter-cell interface 1320 may correspond to the X2 interface. As further illustrated, the access node may include a management interface 1330. The management interface 1330 may be used for communication with a management node of the cellular network, such as the management node 200.

Further, the access node includes one or more processor(s) 1350 coupled to the interfaces 1310, 1320, 1330 and a memory 1360 coupled to the processor(s) 1350. The memory 1360 may include a ROM, e.g., a flash ROM, a RAM, e.g., a DRAM or SRAM, a mass storage, e.g., a hard disk or solid state disk, or the like. The memory 1360 includes suitably configured program code modules to be executed by the processor(s) 1350 so as to implement the above-described functionalities of the access node, e.g., as illustrated by the method of FIG. 10 or 11. As illustrated, the program code modules in the the memory 1360 may include a measurement report collection module 1370 for so as to implement the above-described functionalities of obtaining measurements of received signal strengths from communication devices, e.g., as explained in connection with step 1000 of FIG. 10. Further, the program code modules in the memory 1360 may include a measurement analysis module 1380 so as to implement the above-described functionalities of evaluating measurements to determine the adjacency-level KPIs or cell-level KPIs, e.g., as explained in connection with steps 1020, 1030, 1040 of FIG. 10 or step 1110 of FIG. 11. Further the program code modules stored in the memory 1360 may include a reporting/control module 1390 so as to implement the above-described functionalities of controlling an antenna tilt angle or a transmit power on the basis of the determined cell-level KPIs. Further, the reporting/control module 1390 may also implement functionalities for reporting the determined KPIs, e.g., to other nodes such as a management node or other access nodes.

It is to be understood that the structures as illustrated in FIG. 13 are merely schematic and that the access node may actually include further components which, for the sake of clarity, have not been illustrated, e.g., further interfaces or further processors. Also, it is to be understood that the memory 1360 may include further types of program code modules, which have not been illustrated, e.g., program code modules for implementing known functionalities of an access node, e.g., known functionalities of an NB, eNB, or RNC. In some implementations, also a computer program may be provided for implementing functionalities of the access node, e.g., in the form of a physical medium storing the program code modules to be stored in the memory 1360 or by making such program code available for download or streaming.

As can be seen, the concepts as described above may be used for efficiently managing a cellular network. Specifically, the cell-level interference KPI may be efficiently obtained from measurements of received signal strengths, which are typically also used for other purposes and therefore available with high granularity and without additional effort. Further, the cell-level interference KPI precisely indicates whether the considered cell is overshooting to other cells. As compared to other indicators the cell-level interference KPI may allow for avoiding coverage problems and to detect situations where overshooting cells do not capture distant traffic but still generate unnecessary interference.

It is to be understood that the examples and embodiments as explained above are merely illustrative and susceptible to various modifications. For example, the concepts may be applied in various kinds of cellular networks, without limitation to the above-mentioned technologies. Further, the determined KPIs may be utilized for various other purposes. Moreover, it is to be understood that the above concepts may be implemented by using correspondingly designed software to be executed by one or more processors of an existing device, or by using dedicated device hardware.

The invention claimed is:

1. A method of managing a cellular network, the method comprising:
    a node of the cellular network obtaining, for a given cell of the cellular network, reporting of measurements performed by one or more communication devices associated with a surrounding cell of the given cell, each measurement indicating a received signal strength of a signal from the given cell;
    the node determining, based on the received signal strengths, a level of interference generated by the given cell with respect to the surrounding cell,
    wherein each measurement further indicates a received signal strength of a signal received from the surrounding cell to which the communication device is associated;
    for each measurement, the node comparing the received signal strength of the signal from the given cell to the received signal strength of the signal from the surrounding cell to which the communication device is associated;
    the node classifying, based on the comparison, the given cell as a relevant interferer of the surrounding cell;
    for each measurement, the node calculating a difference between the received signal strength of the signal from the given cell and the received signal strength of the signal from the surrounding cell to which the communication device is associated;
    the node comparing the difference to at least one threshold;
    the node classifying, based on the comparison, the given cell as a relevant interferer of the surrounding cell;
    in response to the difference being below a first threshold, the node incrementing a first counter;
    the node determining a first ratio of a value of the first counter and a total number of the measurements with respect to the given cell;
    the node classifying, based on the first ratio and a configured threshold percentage of measurements above which the given cell is classified as a relevant interferer of the surrounding cell, the given cell as a relevant interferer of the surrounding cell;
    wherein each measurement further indicates received signal strengths of signals from one or more further cells of the cellular network;
    the node checking, for each measurement, whether any of the received signal strengths of the signals from the one or more further cells is higher than the received signal strength of the signal from the given cell; and
    the node performing the incrementing of the first counter only if any of the received signal strengths of the signals from the one or more further cells is higher than the received signal strength of the signal from the given cell.

2. The method of claim 1, further comprising:
    in response to the difference being below a second threshold, the node incrementing a second counter;
    determining a second ratio of a value of the second counter and a total number of the measurements with respect to the given cell; and
    the node classifying, based on the second ratio and a configured threshold percentage of measurements above which the given cell is classified as a relevant candidate for a handover from the surrounding cell, the given cell as a relevant candidate for a handover from the surrounding cell.

3. The method of claim 2, wherein:
    each measurement further indicates received signal strengths of signals from one or more further cells of the cellular network;
    the node checks, for each measurement, whether the received signal strength of the signal from the given cell is higher than the received signal strengths of the signals from the one or more further cells; and
    the node performs the incrementing of the second counter only if the received signal strength of the signal from the given cell is higher than the received signal strengths of the signals from the one or more further cells.

4. The method of claim 2, further comprising the node classifying the given cell as a relevant interferer of the surrounding cell only if the given cell is not classified as a relevant candidate for a handover from the surrounding cell.

5. The method of claim 1, wherein the node is an access node serving the surrounding cell.

6. The method of claim 5, further comprising the node indicating to an access node serving the given cell whether the given cell is classified as a relevant interferer of the surrounding cell.

7. The method of claim 6, further comprising:
    the access node serving the given cell receiving, from access nodes serving one or more further surrounding cells of the given cell, indications whether the given cell is classified as a relevant interferer of the respective surrounding cell; and
    the access node serving the given cell determining, based on the indications, an indicator of a level of interference generated by the given cell with respect to the surrounding cells.

8. The method of claim 1, wherein the node is a management node responsible for management of the given cell, the surrounding cell, and one or more further surrounding cells of the given cell.

9. The method of claim 1, wherein the node is an access node of the given cell and receives the reports of measurements from the surrounding cell and a plurality of further surrounding cells of the given cell.

10. The method of claim 8, further comprising:
    the node performing, for each of the surrounding cells, a determination whether the given cell is classified as a relevant interferer of the respective surrounding cell; and
    the node determining, based on the determinations, an indicator of a level of interference generated by the given cell with respect to the surrounding cells.

11. The method of claim 7, wherein the indicator represents a number of the surrounding cells for which the given cell is classified as a relevant interferer.

12. The method of claim 7, further comprising adjusting an antenna tilt angle of the given cell based on the indicator.

13. The method of claim 7, further comprising adjusting an transmit power of the given cell based on the indicator.

14. A node for a cellular network, the node comprising:
at least one interface for obtaining reports of measurements performed by one or more communication devices in the cellular network; and
one or more processors configured to:
  obtain, for a given cell of the cellular network, reports of measurements performed by one or more communication devices associated with a surrounding cell of the given cell, each measurement indicating a received signal strength of a signal from the given cell;
  determine, based on the received signal strengths, a level of interference generated by the given cell with respect to the surrounding cell,
  wherein each measurement further indicates a received signal strength of a signal received from the surrounding cell to which the communication device is associated;
  for each measurement, compare the received signal strength of the signal from the given cell to the received signal strength of the signal from the surrounding cell to which the communication device is associated;
  classify, based on the comparison, the given cell as a relevant interferer of the surrounding cell;
  for each measurement, calculate a difference between the received signal strength of the signal from the given cell and the received signal strength of the signal from the surrounding cell to which the communication device is associated;
  compare the difference to at least one threshold;
  classify, based on the comparison, the given cell as a relevant interferer of the surrounding cell;
  in response to the difference being below a first threshold, increment a first counter;
  determine a first ratio of a value of the first counter and a total number of the measurements with respect to the given cell;
  classify, based on the first ratio and a configured threshold percentage of measurements above which the given cell is classified as a relevant interferer of the surrounding cell, the given cell as a relevant interferer of the surrounding cell;
  wherein each measurement further indicates received signal strengths of signals from one or more further cells of the cellular network;
  check, for each measurement, whether any of the received signal strengths of the signals from the one or more further cells is higher than the received signal strength of the signal from the given cell; and
  perform the incrementing of the first counter only if any of the received signal strengths of the signals from the one or more further cells is higher than the received signal strength of the signal from the given cell.

* * * * *

UNITED STATES PATENT AND TRADEMARK OFFICE
CERTIFICATE OF CORRECTION

PATENT NO. : 10,517,007 B2
APPLICATION NO. : 15/505202
DATED : December 24, 2019
INVENTOR(S) : Miguel Ángel Regueira Caumel et al.

It is certified that error appears in the above-identified patent and that said Letters Patent is hereby corrected as shown below:

On the Title Page

Item (72) Inventors: Ángel Regueira Caumel, Málaga (ES), Victor Buenestado García, Málaga (ES), Isabel De La Bandera Cascales, Málaga (ES), José María Ruiz Avilés, Málaga (ES), Matías Toril Genovés, Málaga (ES)

Should read -- (72) Inventors: Miguel Ángel Regueira Caumel, Málaga (ES), Victor Buenestado García, Málaga (ES), Isabel De La Bandera Cascales, Málaga (ES), José María Ruiz Avilés, Málaga (ES), Matías Toril Genovés, Málaga (ES) --

Signed and Sealed this
Fifth Day of May, 2020

Andrei Iancu
*Director of the United States Patent and Trademark Office*